United States Patent
Herzig et al.

(10) Patent No.: US 6,764,717 B2
(45) Date of Patent: Jul. 20, 2004

(54) ALKENYL-FUNCTIONAL SILOXANE COPOLYMERS AS ANTIMISTING ADDITIVES FOR SILICONE COATING COMPOSITIONS

(75) Inventors: Christian Herzig, Feichten (DE); Hans Lautenschlager, Haiming (DE); Martina Bloechl, Reut (DE)

(73) Assignee: Wacker-Chemie GmbH, Munich (DE)

( * ) Notice: Subject to any disclaimer, the term of this patent is extended or adjusted under 35 U.S.C. 154(b) by 5 days.

(21) Appl. No.: 10/298,715

(22) Filed: Nov. 18, 2002

(65) Prior Publication Data

US 2003/0134043 A1 Jul. 17, 2003

(30) Foreign Application Priority Data

Dec. 13, 2001 (DE) .......................................... 101 61 334

(51) Int. Cl.$^7$ ................................................. B05D 1/02
(52) U.S. Cl. ....................................... 427/387; 427/421
(58) Field of Search ................................. 427/387, 421

(56) References Cited

U.S. PATENT DOCUMENTS

| | | | |
|---|---|---|---|
| 3,775,452 | A | 11/1973 | Karstedt |
| 5,241,034 | A | 8/1993 | Herzig et al. |
| 5,691,435 | A | 11/1997 | Herzig et al. |
| 5,760,145 | A | 6/1998 | Herzig et al. |
| 6,034,225 | A | 3/2000 | Weidner et al. |
| 6,258,913 | B1 | 7/2001 | Herzig et al. |
| 6,265,497 | B1 | 7/2001 | Herzig |
| 6,274,692 | B1 | 8/2001 | Herzig et al. |

FOREIGN PATENT DOCUMENTS

| | | | |
|---|---|---|---|
| DE | 195 22 144 A1 | | 1/1997 |
| DE | 196 29 053 A1 | | 1/1998 |
| EP | 0 716 115 A2 | | 6/1996 |
| EP | 0 523 660 B1 | | 3/1997 |
| EP | 1 008 615 B1 | | 6/2001 |
| EP | 1277786 | * | 1/2003 |
| WO | WO 99/27031 | * | 6/1999 |
| WO | WO 01/98420 | | 12/2001 |
| WO | WO 2003/74621 | * | 9/2003 |

OTHER PUBLICATIONS

English Derwent Abstract AN 1997–053209 [06] Corresponding To DE 195 22 144 A1, Jan. 2, 1997.
English Derwent Abstract AN 1998–087924 [09] Corresponding To DE 196 29 053.

\* cited by examiner

*Primary Examiner*—Erma Cameron
(74) *Attorney, Agent, or Firm*—Brooks Kushman P.C.

(57) ABSTRACT

Antimisting additives are used in crosslinkable silicone coating compositions for reducing aerosol formation, the antimisting additives being alkenyl-functional siloxane copolymers prepared by reacting a hydrocarbon containing at least three aliphatic double bonds, and with an organosiloxane (2) having terminal Si-bonded hydrogen atoms in the presence of a hydrosilylation catalyst (3) at a ratio of Si-bonded hydrogen to aliphatic double bonds of from 1.3 to 10, and subsequently reacting the resulting SiH-containing hydrocarbon-siloxane copolymer with an $\alpha,\omega$-dialkenylsiloxane polymer (4) in the presence of a hydrosilylation catalyst (3) at a ratio of aliphatic double bonds to Si-bonded hydrogen of from 1.2 to 10, and optionally, in another step, equilibrating the resulting alkenyl-functional siloxane copolymers with an organopolysiloxane (5).

12 Claims, No Drawings

ALKENYL-FUNCTIONAL SILOXANE COPOLYMERS AS ANTIMISTING ADDITIVES FOR SILICONE COATING COMPOSITIONS

BACKGROUND OF THE INVENTION

1. Field of the Invention

The invention relates to the use of antimisting additives for reducing the formation of aerosol in crosslinkable silicone coating compositions.

2. Background Art

A trend within the silicone coating industry is to increase machine speed in order to raise productivity. Where silicone coatings are applied to a substrate at relatively high speeds, for example at speeds of more than 300 m/min, fine spray mists of the silicone coating system may be formed. This aerosol is formed at the silicone applicator unit. The formation of this spray mist has proven to be a serious problem in the context of further increasing the coating speed. The formation of this spray mist can be reduced by adding what are known in the industry as antimisting additives to the silicone coating system.

EP-A 716 115 (Dow Corning Corp.) describes antimisting additives obtained by reacting an organosilicon compound, a compound containing oxyalkylene groups, and a catalyst. The addition of these oxyalkylene-functional reaction products to crosslinkable silicone coating systems reduces the formation of aerosol in rapid coating processes.

U.S. Pat. No. 6,265,497 (Wacker-Chemie GmbH) describes alkenyl functional siloxane copolymers which are branched and whose organopolysiloxane blocks are linked by hydrocarbon bridges.

It would be desirable to provide antimisting additives for silicone coating compositions which reduce the formation of aerosol in rapid coating processes, which are readily miscible with the silicone coating compositions, and which do not impair the silicone coating compositions.

SUMMARY OF THE INVENTION

The present invention provides efficient antimisting additives for use in silicone coating processes prepared by hydrosilylation of an at least tris(alkenyl)-substituted hydrocarbon radical with an organopolysiloxane bearing terminal SiH groups, wherein the SiH groups of the organopolysiloxane are in stoichiometric excess with respect to alkenyl groups, followed by reaction of the SiH-functional product with a stoichiometric excess of an α,ω-dialkenylsiloxane polymer. The alkenyl-functional product and/or the SiH-functional intermediate product may optionally be equilibrated with further functional or non-functional organopolysiloxanes.

DETAILED DESCRIPTION OF THE PREFERRED EMBODIMENTS

The invention provides for the use of antimisting additives in crosslinkable silicone coating compositions for reducing the formation of aerosol, comprising employing as antimisting additives, alkenyl-functional siloxane copolymers prepared, in a first step, by reacting a compound (1) containing at least three aliphatic double bonds, of the general formula

  (I)

where $R^2$ is a trivalent or tetravalent hydrocarbon radical having preferably from 1 to 25 carbon atoms per radical, and which can contain one or more non-adjacent heteroatoms selected from oxygen, silicon, and titanium, $R^3$ is a hydrogen atom or an alkyl radical having from 1 to 6 carbon atoms per radical, and x is 3 or 4, with an organosiloxane (2) having terminal Si-bonded hydrogen atoms, in the presence of a catalyst (3) which promotes the addition of Si-bonded hydrogen onto aliphatic double bonds, the ratio of Si-bonded hydrogen in the organosiloxane (2) to aliphatic double bond in the compound (1) being from 1.3 to 10, preferably from 1.5 to 5; and in a second step, reacting the resulting hydrocarbon-siloxane copolymers, containing Si-bonded hydrogen atoms, with α,ω-dialkenylsiloxane polymer (4) in the presence of a catalyst (3) which promotes the addition of Si-bonded hydrogen onto aliphatic double bonds, the ratio of aliphatic double bond in the α,ω-dialkenylsiloxane polymer (4) to Si-bonded hydrogen in the siloxane copolymers being from 1.2 to 10, preferably from 1.5 to 5; and optionally in a third step, equilibrating the resulting alkenyl-functional siloxane copolymers with organopolysiloxane (5), selected from among linear organopolysiloxanes containing terminal triorganosiloxy groups, linear organopolysiloxanes containing terminal hydroxyl groups, branched organopolysiloxanes optionally containing hydroxyl groups, cyclic organopolysiloxanes, and copolymers comprising diorganosiloxane and monoorganosiloxane units.

The alkenyl-functional siloxane copolymers may be prepared employing techniques now known to the art, for example as described in U.S. Pat. No. 6,265,497, incorporated herein by reference.

The alkenyl-functional siloxane copolymers antimisting additives of the invention have the advantage that they not only reduce the formation of aerosol formed by crosslinkable silicone coating compositions in rapid coating systems, but also, in particular, can be homogeneously mixed in any desired proportions, with the crosslinkable silicone coating compositions, unlike the antimisting additives containing polyglycol groups from the above-cited EP-A 716 115. Moreover, the antimisting additives of the invention have no inhibiting effect on the cure of the coatings.

In the alkenyl-functional siloxane copolymers of the invention the siloxane blocks are preferably connected to one another by way of hydrocarbon bridges, resulting in a hydrocarbon-siloxane block structure. The alkenyl-functional siloxane copolymers preferably have a viscosity of from 0.05 to 500,000 Pa.s at 25° C., more preferably from 0.1 to 100,000 Pa.s at 25° C., and most preferably, from 0.2 to 10 000 Pa.s at 25° C.

One preferred embodiment in the case of very viscous siloxane copolymers is the preparation of the alkenyl-functional siloxane copolymers of the invention in solvents, preferably hydrocarbons having a boiling point preferably below 150° C., such as toluene, xylene, n-hexane, n-octane, isooctane, and petroleum fractions, preferably in a concentration of from 20–60% by weight siloxane content, although higher or lower concentrations may be used as well.

In the first process step it is possible to use a single compound (1) or multiple compounds (1). As compound (1) in the first process step it is preferred to use compounds in which $R^2$ is a trivalent hydrocarbon radical, preferably having from 1 to 25 carbon atoms per radical, where x is 3.

The organosiloxane (2) used in the first process step preferably contains two Si-bonded hydrogen atoms per molecule. In the first process step it is possible to use a single organosiloxane (2) or different organosiloxanes (2). It is preferred to use, a organosiloxane (2) an organosiloxane of the general formula $$HR_2SiO(SiR_2O)_nSiR_2H \qquad (II)$$

where preferably each R is an identical or different, unhalogenated or halogenated ("optionally halogenated") hydrocarbon radical having from 1 to 6 carbon atoms per radical, and n is 0 or an integer, preferably an integer from 7 to 2000, with each integer between 0 and 2000 considered to have been explicitly disclosed herein.

In the second process step it is possible to use one kind of α,ω-dialkenylsiloxane polymer (4) or different kinds of α,ωdialkenylsiloxane polymer (4). As the α,ω-dialkenylsiloxane polymer (4) in the second process step it is preferred to use a polymer of the general formula $$R^4{}_aR_{3-a}SiO(R_2Si-R^1-SiR_2O)_m(R_2SiO)_kSiR^4{}_aR_{3-a} \qquad (III)$$

where R is as defined above, $R^1$ is a divalent hydrocarbon radical, preferably an alkylene radical, and more preferably an alkylene radical having from 2 to 10 carbon atoms per radical, or is a divalent silane or siloxane radical, having from 2 to 10 Si units, $R^4$ is a terminally olefinically unsaturated radical having from 2 to 10 carbon atoms, a can be identical or different and is 0 or 1, preferably, on average from 0.7 to 1.0, m is 0 or an integer from 1 to 10, preferably 0, and k is 0 or an integer from 1 to 1000, preferably from 20 to 1000, and more preferably from 50 to 500.

Examples of radicals R are alkyl radicals, such as the methyl, ethyl, n-propyl, isopropyl, 1-n-butyl, 2-n-butyl, isobutyl, tert-butyl, n-amyl, and n-hexyl radicals. The methyl radical is preferred. Examples of halogenated radicals R are haloalkyl radicals such as the 3,3,3-trifluoro-n-propyl radical, the 2,2,2,2',2',2'-hexafluoroisopropyl radical, and the heptafluoroisopropyl radical. These examples of radicals R are exemplary, and not limiting.

Non-limiting examples of alkyl radicals $R^3$ are the methyl, ethyl, n-propyl, isopropyl, 1-n-butyl, 2-n-butyl, isobutyl, tert-butyl, n-pentyl, isopentyl, neopentyl, tert-pentyl radicals, and hexyl radicals such as the n-hexyl radical. $R^3$ is preferably a hydrogen atom.

Examples of radicals $R^4$ include alkenyl radicals such as the vinyl, 5-hexenyl, cyclohexenyl, 1-propenyl, allyl, 3-butenyl, 4-pentenyl, and 7-octenyl radicals, and alkynyl radicals such as the ethynyl, propargyl, and 1-propynyl radicals. The radical $R^4$ preferably comprises alkenyl radicals, the vinyl radical being particularly preferred.

Examples of compounds (1) from which the alkenyl-functional siloxane copolymers of the invention can be prepared include 1,2,4-trivinylcyclohexane, 1,3,5-trivinylcyclohexane, 3,5-dimethyl-4-vinyl-1,6-heptadiene, 1,2,3,4-tetravinylcyclobutane, methyltrivinylsilane, tetravinylsilane, and 1,1,2,2-tetraallyloxyethane, preference being given to 1,2,4-trivinylcyclohexane.

Examples of the radical $R^2$ therefore include those of the formulae:

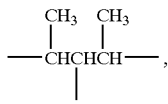

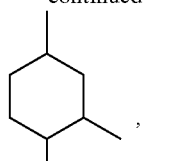

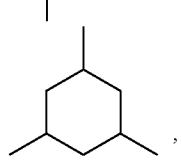

and

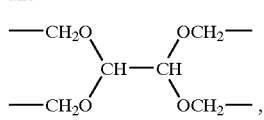

preference being given to the radical

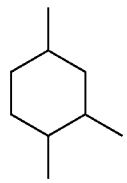

Examples of α,ω-dialkenylsiloxanepolymer (4) with which the alkenyl-functional siloxane copolymers of the invention can be prepared include α,ω-divinylpolydimethylsiloxane, α,ω-diallylpolydimethylsiloxane, α,ω-dihexenylpolydimethylsiloxane, α,ω-dioctenylpolydimethylsiloxane, and also polyadducts of organosiloxane (2) and dienes such as 1,5-hexadiene, 1,7-octadiene, 1,9-decadiene, 1,11-dodecadiene, 1,13-tetradecadiene, 2,5-dimethyl-1,5-hexadiene, 3,5-dimethyl-1,6-heptadiene, 1,3-divinylbenzene, 1,4-divinylbenzene, 1,3-diisopropenylbenzene, divinyldimethylsilane, 1,3-divinyl-1,1,3,3-tetramethyldisiloxane, preference being given to α,ω-divinylpolydimethylsiloxanes and α,ω-dihexenylpolydimethylsiloxanes.

Examples of radicals $R^1$ include those of the formula $-(CH_2)_6-$, $-(CH_2)_8-$, $-(CH_2)_{10}-$, $-(CH_2)_{12}-$, $-(CH_2)_{14}-$, $-CH_2CH_2-C_6H_4-CH_2CH_2-$, and

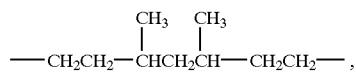

the radical of the formula $-(CH_2)_6-$ being preferred.

Organosiloxane (2) is used in the first process step in amounts such that the ratio of Si-bonded hydrogen in organosiloxane (2) to aliphatic double bond in compound (1) is from 1.3 to 10, preferably from 1.5 to 4.0, and more preferably from 1.8 to 3.0. Since organosiloxane (2) is used in excess, therefore, in the first process step, generally all of the aliphatic double bonds in compound (1) are reacted, and siloxane copolymers are obtained which contain Si-bonded hydrogen atoms.

To illustrate the first process step, the reaction of compound (1), such as 1,2,4-trivinylcyclohexane (compound (1)), with excess α,ω-dihydropolydimethyldisiloxane, (compound 2) in the presence of catalyst (3) can be considered to produce a siloxane copolymer mixture which preferably includes a fraction of more than 50% of individual compounds $T_3$ and $T_4$, and polymers with higher degrees of branching:

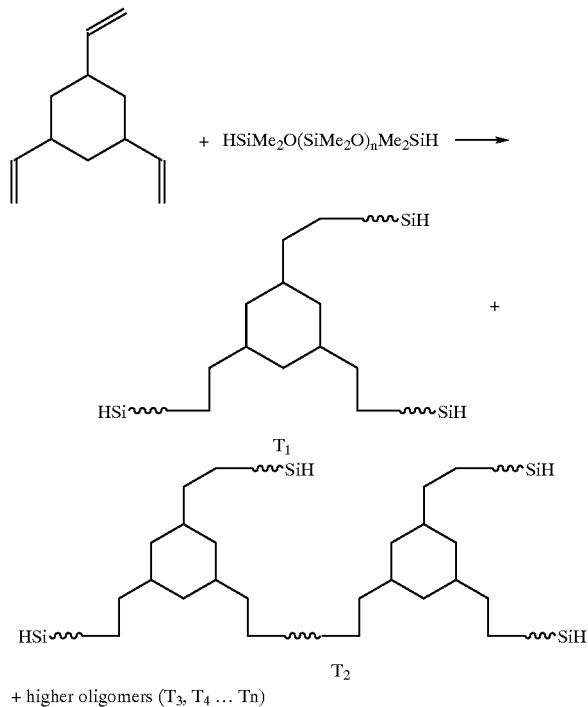

+ higher oligomers ($T_3$, $T_4$ ... $T_n$)

Depending on the stoichiometric ratio H—Si/C=C, the siloxane copolymer mixture includes varying amounts of residual organosiloxane (2), which in the case of low molecular weights can be removed in vacuo, and which otherwise may remain in the product mixture as a component containing active hydrogen.

As catalysts (3) which promote the addition of Si-bonded hydrogen onto aliphatic double bond it is possible to use any convenient hydrosilylation catalyst, for example the same catalysts which have been used to date for promoting the addition of Si-bonded hydrogen onto an aliphatic double bond. The catalysts (3) are preferably a metal from the group of the platinum metals or a compound or complex from the group of the platinum metals. Examples of such catalysts are metallic and finely divided platinum, which may supported on supports such as silica, alumina or activated carbon, compounds or complexes of platinum, such as platinum halides, e.g., $PtCl_4$, $H_2PtCl_6·6H_2O$, $Na_2PtCl_4·4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6·6H_2O$ and cyclohexanone, platinum-vinylsiloxane complexes such as platinum-1,3-divinyl-1,1,3,3-tetramethyldisiloxane complexes with or without a detectable inorganically bonded halogen content, bis(gamma-picoline)platinum dichloride, trimethylenedipyridineplatinum dichloride, dicyclopentadieneplatinum dichloride, dimethylsulfoxide-ethyleneplatinum(II) dichloride, cyclooctadieneplatinum dichloride, norbornadieneplatinum dichloride, gamma-picolineplatinum dichloride, and cyclopentadieneplatinum dichloride.

In the first process step, the catalyst (3) is preferably used in amounts of from 0.5 to 100 ppm by weight (parts by weight per million parts by weight), more in amounts of from 2 to 10 ppm by weight, calculated in each case as elemental platinum and based on the overall weight of compound (1) and organosiloxane (2).

The first process step is preferably conducted at the pressure of the surrounding atmosphere, i.e., approximately at 1020 hPa (abs.), but may also be conducted at higher or lower pressures. Furthermore, the first process step is preferably conducted at a temperature of from 20° C. to 150° C., more preferably from 20° C. to 120° C., with particular preference at from 20° C. to 100° C.

Since compounds (1), containing at least three aliphatic double bonds, e.g., 1,2,4-trivinylcyclohexane, tend towards polymerization at relatively high temperatures, it is possible in the first process step to add polymerization inhibitors (free radical inhibitors), such as 4-methoxyphenol, 2,6-bis(tert-butyl)4-methylphenol, phenothiazine, hydroquinone or pyrocatechol. The inhibitors are preferably used in amounts of from 10 to 500 ppm by weight, based on the overall weight of compound (1) and organosiloxane (2).

In both the first and the second process steps it is possible to use organic solvents, preferably inert organic solvents. Examples of inert organic solvents are toluene, xylene, octane isomers, heptane isomers, butyl acetate, 1,2-dimethoxyethane, tetrahydrofuran, and cyclohexane. The inert organic solvents, when used, may be removed by distillation after the first and/or second process step, or may remain in the reaction mixture.

In the second process step, α,ω-dialkenylsiloxanepolymer (4) is used in amounts such that the ratio of aliphatic double bonds in the α,ω-dialkenylsiloxanepolymer (4) to Si-bonded hydrogen in the hydrocarbon-siloxane copolymer obtained in the first step is from 1.2 to 10, preferably from 1.5 to 5.0, most preferably from 2.0 to 4.0. Since the α,ω-dialkenylsiloxanepolymer (4) is used in excess in the second process step, generally all of the Si-bonded hydrogen atoms of the hydrocarbon-siloxane copolymers obtained in the first process step are reacted, and alkenyl-functional siloxane copolymers are thereby obtained.

In the second process step the catalyst (3) is used preferably in amounts of from 0.5 to 100 ppm by weight, more preferably from 2 to 10 ppm by weight, calculated in each case as elemental platinum and based on the overall weight of α,ω-dialkenylsiloxanepolymer (4) and the SiH-containing hydrocarbon-siloxane copolymer obtained in the first process step.

The second process step is preferably conducted at the pressure of the surrounding atmosphere, i.e., approximately at 1020 hPa (abs.), but may also be conducted at higher or lower pressures. Furthermore, the second process step is preferably conducted preferably at a temperature of from 20° C. to 150° C., more preferably from 20° C. to 120° C.

In the third, optional process step, the alkenyl-functional siloxane copolymers obtained in the second process step can be equilibrated with organopolysiloxane(s) (5). This optional third process step, may be used to increase the average chain lengths of the components (2) and (4).

In addition, by employing the third process step, more highly branched siloxane copolymers may be obtained. In the course of the equilibration, a process known to the skilled worker, the formation of cyclic structures without functional groups, generally in amounts of from 8 to 15% by weight is unavoidable, but not disruptive. If desired, the volatile fractions thereof (cyclic structures having 3–9 Si atoms) can be removed from the product mixture under vacuum at elevated temperatures. Like the cyclic structures, other undesirable but nondisruptive byproducts may be obtained in small amounts during the equilibration.

As organopolysiloxanes (5) it is preferred to use those selected from organopolysiloxanes, preferably linear organopolysiloxanes containing terminal triorganosiloxy groups corresponding to the formula $$R_3SiO(SiR_2O)_rSiR_3,$$

where R is as defined above and
r is 0 or an integer whose value is preferably from 1 to 1500, more preferably from 10 to 300;
linear organopolysiloxanes containing terminal hydroxyl groups corresponding to the formula $$HO(SiR_2O)_sH$$

where R is as defined above and s is an integer whose value is preferably from 1 to 1500, more preferably from 10 to 300;
branched organopolysiloxanes optionally containing hydroxyl groups, comprising units of the formula $$R_3SiO_{1/2}, R_2SiO \text{ and } RSiO_{3/2}$$

where R is as defined above;
cyclic organopolysiloxanes of the formula $$(R_2SiO)_t$$

where R is as defined above and t is an integer from 3 to 12;
and copolymers comprising units of the formula $$R_2SiO \text{ and } RSiO_{3/2}$$

where R is as defined above.

Preferred organopolysiloxanes (5) are preferably those of the formulae $R_3SiO(SiR_2O)_rSiR_3$, $HO(SiR_2O)_sH$ and $(R_2SiO)_t$, particular preference being given to those of the formula $R_3SiO(SiR_2O)_rSiR_3$.

In the optional equilibration the ratio of organopolysiloxanes (5) to alkenyl-functional siloxane copolymers is determined merely by the fraction of alkenyl groups in the siloxane copolymers desired to be produced in the course of the equilibration, and by the desired average chain length.

In the course of the equilibration, it is preferred to use basic or acidic catalysts which promote equilibration examples of basic catalysts include alkali hydroxides such as sodium hydroxide, potassium hydroxide, and cesium hydroxide, trimethylbenzylammonium hydroxide, and tetraethylammonium hydroxide. Alkali metal hydroxides are preferred. Alkali metal hydroxides are preferably used in amounts of from 50 to 10,000 ppm by weight, more preferably from 500 to 2000 ppm by weight.

Examples of acidic catalysts include sulfuric acid, phosphoric acid, trifluoromethanoic acid, phosphorus nitride chlorides, and acidic catalysts which are solid under the reaction conditions, such as acid-activated bleaching earth, acidic zeolites, sulfonated charcoal, and sulfonated styrene-divinylbenzene copolymers. Phosphorus nitride chlorides are preferred. Phosphorus nitride chlorides are used preferably in amounts of from 5 to 1000 ppm by weight, more preferably from 50 to 200 ppm by weight. These catalyst amounts are based, in each case, on the overall weight of the alkenyl-functional siloxane copolymers and organopolysiloxanes (5).

The equilibration is preferably conducted at from 100° C. to 150° C. and under the pressure of the surrounding atmosphere, i.e., approximately at 1020 hPa (abs.). If desired, however, it is also possible to employ higher or lower temperatures and/or pressures. The equilibration is preferably conducted in from 5 to 20% by weight, based on the total weight of the respective alkenyl-functional siloxane copolymers and organopolysiloxanes (5), in water-immiscible solvent such as toluene. The catalyst can be deactivated before the equilibration mixture is worked up.

The process of the invention can be conducted batchwise, semicontinuously or fully continuously.

Alternatively to the described sequence of process steps for preparing alkenyl-functional hydrocarbon-siloxane copolymers it is possible, if desired to increase the average molecular weight and/or chain extension of the hydrocarbon-siloxane copolymers obtained in the $1^{st}$ process step, to equilibrate following the $2^{nd}$ process step as well. The equilibration is performed employing the same organopolysiloxanes (5) and under the same reaction conditions described previously. Preferred organopolysiloxanes (5) are those of the formulae $R_3SiO(SiR_2O)_rSiR_3$, $HO(SiR_2O)_sH$ and $(R_2SiO)_t$, particular preference being given to those of the formula $R_3SiO(SiR_2O)_rSiR_3$, R being as defined above.

In the case of this alternative sequence of the process steps, the active hydrogen-containing hydrocarbon-siloxane copolymers obtained by equilibration are then reacted in a following process step with α,ω-dialkenylsiloxanepolymer (4), the latter preferably being used in amounts such that the ratio of aliphatic double bond in (4) to Si-bonded hydrogen in copolymer obtained beforehand is preferably 1.5-5.0, with particular preference, 2.0-4.0.

This alternative sequence, therefore, represents merely a change in the order of the steps described at the outset, so that optional equilibration step 3 is implemented prior to process step 2.

As antimisting additives it is preferred to use those alkenyl-functional siloxane copolymers which are prepared without a further equilibration step and which have a particularly high level of branching. Preferred additives are obtained from operating in the most preferred stoichiometric ranges. Since these siloxane copolymers generally have relatively high viscosities, they can be mixed with further siloxane (4) following their preparation for the purpose of greater ease of handling.

For reducing the formation of aerosol the antimisting additives of the invention are added to the crosslinkable silicone coating compositions. The antimisting alkenyl-functional siloxane copolymer additives are preferably employed in the crosslinkable silicone coating compositions in amounts of from 0.5 to 10% by weight, more preferably from 1 to 5% by weight, based on the overall weight of the crosslinkable silicone coating compositions.

As crosslinkable silicone coating compositions it is preferred to use those comprising (A) organosilicon compounds having radicals containing aliphatic carbon-carbon multiple bonds, (B) organosilicon compounds containing Si-bonded hydrogen atoms, (C) catalysts which promote the addition of Si-bonded hydrogen onto aliphatic multiple bond, and if desired, (D) inhibitors.

The invention further provides crosslinkable silicone coating compositions featuring reduced aerosol formation, comprising antimisting additives of the invention, organosilicon compounds having radicals containing aliphatic carbon-carbon multiple bonds, organosilicon compounds containing Si-bonded hydrogen atoms, catalysts which promote the addition of Si-bonded hydrogen onto aliphatic multiple bond, and if desired inhibitors.

For the crosslinkable silicone coating compositions it is possible to use a single antimisting additive (X) of the invention or different of the antimisting additives (X) of the invention. Use of a single additive is preferred. It should be noted that the term "single" as it applies to the additive does not imply that only one molecular species is involved; rather it implies that a mixture of species from a single antimisting additive preparation is used, which will contain a variety of molecules, which is clear to one skilled in the art.

In the crosslinkable silicone coating compositions, for the organopolysiloxanes (A) having radicals containing aliphatic carbon-carbon multiple bonds, it is preferred to use linear or branched organopolysiloxanes comprising units of the general formula IV $$R^5_z R^6_y SiO_{\frac{4-z-y}{2}} \quad (IV)$$

where $R^5$ is a monovalent, unsubstituted or substituted hydrocarbon radical having from 1 to 18 carbon atoms per radical and free from aliphatic carbon-carbon multiple bonds, $R^6$ is a monovalent hydrocarbon radical having from 2 to 8 carbon atoms per radical and containing a terminal aliphatic carbon-carbon multiple bond, z is 0, 1, 2 or 3, y is 0, 1 or 2, and the sum z+y is 0, 1, 2 or 3, with the proviso that there are on average at least 1.5 radicals $R^6$, preferably on average at least 2 radicals $R^6$.

Preferred organosilicon compounds (A) are organopolysiloxanes of the general formula $$R^6_g R^5_{3-g} SiO(SiR^5_2O)_v(SiR^5R^6O)_w SiR^5_{3-g}R^6_g \quad (V)$$

where $R^5$ and $R^6$ are as defined above, g is 0, 1 or 2, v is 0 or an integer from 1 to 1500, and w is 0 or an integer from 1 to 200, with the proviso that on average at least 1.5 radicals $R^6$, preferably on average at least 2 radicals $R^6$, are present.

In the context of this invention formula (V) is to be understood to mean that v units —(SiR$^5_2$O)— and w units —(SiR$^5$R$^6$O)— may be distributed arbitrarily in the organopolysiloxane molecule, i.e. randomly, in blocks, and any combination thereof.

As organosilicon compounds (A) it is also possible to use branched polymers containing terminal ω-alkenyl groups, preferably Si-bonded vinyl groups, as described in U.S. Pat. No. 6,034,225, especially column 1 line 43 to column 2 line 13, and U.S. Pat. No. 6,258,913, especially column 1 line 62 to column 2 line 35. As organosilicon compounds (A) it is also possible to use linear organopolysiloxanes as described in U.S. Pat. No. 6,274,692 especially column 2 lines 3 to 27, which do not have an aliphatically unsaturated hydrocarbon radical, such as an Si-bonded vinyl group, at both ends but instead also have aliphatically saturated hydrocarbon radical such as Si-bonded methyl groups, at the ends. The three foregoing U.S. patents are incorporated herein by reference.

As organosilicon compounds (A) it is also possible to use those described in U.S. Pat. No. 5,241,034, especially column 16 line 23 to column 17 line 35, DE-A 195 22 144 especially page 2 lines 44 to 67, DE-A 196 29 053 especially page 2 line 51 to page 3 line 29, and U.S. Pat. No. 5,760,145 especially column 2 line 46 to column 4 line 23. These four foregoing patent documents are herein incorporated by reference.

The organopolysiloxanes (A) preferably have an average viscosity of from 100 to 10,000 mPa.s at 25° C.

Examples of hydrocarbon radicals $R^5$ include alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals, such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as the cyclopentyl, cyclohexyl, cycloheptyl and methylcyclohexyl radicals, aryl radicals such as the phenyl, naphthyl, anthryl and phenanthryl radical; alkaryl radicals such as o-, m-, p-tolyl radicals, xylyl radicals and ethylphenyl radicals, and aralkyl radicals, such as the benzyl radical and the α- and the β-phenylethyl radical.

Examples of radicals $R^6$ include alkenyl radicals such as the vinyl, 5-hexenyl, allyl, 3-butenyl and 4-pentenyl radicals; and alkynyl radicals such as the ethynyl, propargyl and 1-propyne radicals.

As organosilicon compounds (B) which contain Si-bonded hydrogen atoms it is preferred to use linear, cyclic or branched organopolysiloxanes comprising units of the general formula VI $$R^5_e H_f SiO_{\frac{4-e-f}{2}} \quad (VI)$$

where $R^5$ is as defined above, e is 0, 1, 2 or 3, f is 0, 1 or 2 and the sum of e+f is 0, 1, 2 or 3, with the proviso that there are on average at least 2 Si-bonded hydrogen atoms. The organosilicon compounds (B) preferably contain at least 3 Si-bonded hydrogen atoms.

As organosilicon compounds (B) it is more preferred to use organopolysiloxanes of the general formula $$H_h R^5_{3-h} SiO(SiR^5_2O)_o(SiR^5HO)_p SiR^5_{3-h}H_h \quad (VII)$$

where $R^5$ is as defined above, h is 0, 1 or 2, o is 0 or an integer from 1 to 1500, and p is 0 or an integer from 1 to 200, with the proviso that there are on average at least 2 Si-bonded hydrogen atoms. In the context of this invention formula VII is to be understood to mean that o units —(SiR$^5_2$O)— and p units —(SiR$^5$HO)— may be distributed arbitrarily in the organopolysiloxane molecule.

Examples of such organopolysiloxanes are, in particular, copolymers comprising dimethylhydrosiloxane, methylhydrosiloxane, dimethylsiloxane and trimethylsiloxane units; copolymers comprising trimethylsiloxane, dimethylhydrosiloxane and methylhydrosiloxane units; copolymers comprising trimethylsiloxane, dimethylsiloxane and methylhydrosiloxane units; copolymers comprising methylhydrosiloxane and trimethylsiloxane units; copolymers comprising methylhydrosiloxane, diphenylsiloxane and trimethylsiloxane units; copolymers comprising methylhydrosiloxane, dimethylhydrosiloxane and diphenylsiloxane units, copolymers comprising methylhydrosiloxane, phenylmethylsiloxane, trimethylsiloxane and/or dimethylhydrosiloxane units; copolymers comprising methylhydrosiloxane, dimethylsiloxane, diphenylsiloxane, trimethylsiloxane and/or dimethylhydrosiloxane units; and copolymers comprising dimethylhydrosiloxane, trimethylsiloxane, phenylhydrosiloxane, dimethylsiloxane and/or phenylmethylsiloxane units.

As organosilicon compounds (B) it is also possible to use those as described in U.S. Pat. No. 5,691,435 incorporated herein by reference, especially column 3 line 45 to column 4 line 29. The organopolysiloxanes (B) preferably possess an average viscosity of from 10 to 1,000 mPa.s at 25° C.

Organosilicon compound (B) is used preferably in amounts of from 0.5 to 3.5, more preferably from 1.0 to 3.0, gram atoms of Si-bonded hydrogen per mole of Si-bonded radicals containing aliphatic carbon-carbon multiple bonds in the organosilicon compound (A).

In the case of the crosslinkable silicone coating compositions, it is also possible, as catalysts which promote the addition of Si-bonded hydrogen onto aliphatic multiple bonds, to employ the same catalysts which have been previously described for this purpose. As constituent (C) it is preferred to use the abovementioned catalysts (3). The catalysts (C) are used preferably in amounts of from 10 to 1000 ppm by weight more preferably from 50 to 200 ppm by weight, calculated in each case as elemental platinum metal and based on the overall weight of the organosilicon compounds (A) and (B).

The crosslinkable silicone coating compositions may comprise agents which retard the addition of Si-bonded hydrogen onto aliphatic multiple bond at room temperature, commonly known as inhibitors (D). It is possible to use all inhibitors which have been employed to date for this purpose, as well as others which may be discovered in the future.

Examples of inhibitors (D) are 1,3-divinyl-1,1,3,3-tetramethyldisiloxane, benzotriazole, dialkylformamides, alkylthioureas, methyl ethyl ketoxime, organic compounds or organosilicon compounds having a boiling point of at least 25° C. at 1012 mbar (abs.) and containing at least one aliphatic triple bond, such as 1-ethynylcyclohexan-1-ol, 2-methyl-3-butyn-2-ol, 3-methyl-1-pentyn-3-ol, 2,5-dimethyl-3-hexyne-2,5-diol and 3,5-dimethyl-1-hexyn-3-ol, 3,7-dimethyloct-1-yn-6-en-3-ol, a mixture of diallyl maleate and vinyl acetate, maleic monoesters, and inhibitors such as the compound of the formula HC≡C—C(CH$_3$)(OH)—CH$_2$—CH$_2$—CH=C(CH$_3$)$_2$, available commercially under the trade name "Dehydrolinalool" from BASF.

Where inhibitor (D) is used, it is employed in effective amounts, preferably from 0.01 to 10% by weight, more preferably from 0.01 to 3% by weight, based on the overall weight of the organosilicon compounds (A) and (B).

Examples of further constituents which may be used in the crosslinkable silicone coating compositions are agents for adjusting the release force, organic solvents, adhesion promoters, and pigments.

Examples of agents for adjusting the release force of the coatings, that are produced with the compositions of the invention, and which are repellent to tacky substances, include silicone resins comprising units of the formula $R^7R^5_2SiO_{1/2}$ and $SiO_2$, commonly known as MQ resins, where $R^7$ is a hydrogen atom, a hydrocarbon radical $R^5$ such as methyl radical, an alkenyl radical $R^6$ such as vinyl radical, and $R^5$ and $R^6$ are as defined above, and the units of the formula $R^7R^5_2SiO_{1/2}$ may be identical or different. The ratio of units of the formula $R^7R^5_2SiO_{1/2}$ to units of the formula $SiO_2$ is preferably from 0.6 to 2. The silicone resins are used preferably in amounts of from 5 to 80% by weight, based on the overall weight of the organosilicon compounds (A) and (B).

Examples of organic solvents are petroleum spirits, e.g., mixtures of alkanes having a boiling range of from 70° C. to 180° C., including n-heptane, benzene, toluene and xylenes, halogenated alkanes having from 1 to 6 carbon atoms such as methylene chloride, trichloroethylene and perchloroethylene, ethers such as di-n-butyl ether, esters such as ethyl acetate, and ketones such as methyl ethyl ketone and cyclohexanone. Where organic solvents are used, they are employed appropriately in amounts of preferably from 10 to 90% by weight, more preferably from 10 to 70% by weight, based on the overall weight of the organosilicon compounds (A) and (B).

Although the sequence when mixing the constituents (X), (A), (B), (C) and, where used, (D) is not critical, it has nevertheless been found appropriate for practical purposes to add catalyst constituent (C) to the mixture of the other constituents last.

The crosslinking of the compositions of the invention preferably takes place preferably at from 70° C. to 180° C. As energy sources for thermal crosslinking it is preferred to use ovens, e.g., forced air drying ovens or heating tunnels, or to use heated rollers, heated plates, or thermal radiation in the infrared region of the spectrum.

In addition to thermal cure, the compositions of the invention may also be crosslinked by irradiation with ultraviolet light or by irradiation with UV and IR light. As ultraviolet light it is common to use light having a wavelength of 253.7 nm. In commerce there are a large number of lamps which emit ultraviolet light having a wavelength of from 200 to 400 nm and which preferentially emit ultraviolet light having a wavelength of 253.7 nm.

The invention further provides shaped bodies produced by crosslinking the compositions of the invention. The shaped bodies preferably comprise coatings, more preferably coatings which repel tacky substances.

The invention further provides a process for producing coatings by applying crosslinkable compositions of the invention to surfaces that are to be coated, followed by crosslinking the compositions.

The crosslinkable compositions of the invention are used preferably for producing coatings which repel tacky substances, e.g., for producing release papers. Coatings which repel tacky substances are produced by applying crosslinkable compositions of the invention to the surfaces that are to be made repellent to tacky substances and then crosslinking the compositions.

The application of the compositions of the invention to the surfaces to be coated, preferably surfaces to be made repellent to tacky substances, may be accomplished in any desired manner which is suitable for the production of coatings from liquid materials; for example, by dipping, brushing, pouring, spraying, rolling, printing, by means of an offset gravure coating apparatus, for example, blade or knife coating, or by means of an airbrush. The coat thickness on the coated surfaces is preferably from 0.3 to 6 μm, with particular preference to a coat thickness of from 0.5 to 2.0 μm.

The surfaces to be coated, preferably surfaces to be made repellent to tacky substances, which may be treated in the context of the invention may be surfaces of any materials which are solid at room temperature and 1012 mbar (abs.). Examples of surfaces of this kind are those of paper, wood, cork, and polymer films, e.g., polyethylene films or polypropylene films, woven and nonwoven fabric of natural or synthetic fibers, ceramic articles, glass, including glass fibers, metals, polyethylene-coated paper, and boards, including those of asbestos. The abovementioned polyethylene may in each case be high-pressure, medium-pressure or low-pressure polyethylene. In the case of paper the paper in question may be of a low-grade kind, such as absorbent papers, including kraft paper which is in the raw state, i.e., has not been pretreated with chemicals and/or natural polymeric substances, and which has a weight of from 60 to 150 g/m$^2$, unsized papers, papers of low freeness value, mechanical papers, unglazed or uncalendered papers, papers which are smooth on one side owing to the use of a dry glazing cylinder during their production, without additional complex measures, and which are therefore referred to as "machine-glazed papers", uncoated papers or papers produced from waste paper, i.e., what are known as recycled papers. The paper to be treated in accordance with the invention may also of course, however, comprise high-grade paper types, such as low-absorbency papers, sized papers, papers of high freeness value, chemical papers, calendered or glazed papers, glassine papers, parchmentized papers or precoated papers. The boards as well may be of high or low grade.

The compositions of the invention are suitable, for example, for producing release, backing, and interleaving papers, including interleaving papers which are employed in the production of, for example, cast films or decorative films, or of foam materials, including those of polyurethane. The compositions of the invention are also suitable, for example, for producing release, backing, and interleaving cards, films, and cloths, for treating the reverse sides of self-adhesive tapes or self-adhesive sheets or the written faces of self-adhesive labels. The compositions of the invention are additionally suitable for treating packing material, such as that comprising paper, cardboard boxes, metal foils and drums, e.g., cardboard, plastic, wood or iron, which is intended for storing and/or transporting tacky goods, such as adhesives, sticky foodstuffs, e.g., cakes, honey, candies, and meat; bitumen, asphalt, greased materials, and crude rubber. A further example of the application of the compositions of the invention is the treatment of carriers for transferring pressure-sensitive adhesive films in the context of what is known as the transfer process.

The crosslinkable silicone coating compositions comprising the antimisting additives of the invention are especially suitable for use in rapid coating systems with coating speeds of preferably from 300 to 1500 m/min, more preferably from 400 to 1000 m/min, in which the compositions of the invention are applied at high speeds to the surfaces that are to be coated.

The compositions of the invention are suitable for producing self-adhesive materials joined to the release paper, both by the offline method and by the inline method. In the offline method, the silicone composition is applied to the paper and crosslinked, and then, in a subsequent stage, normally after the winding of the release paper onto a roll and after the storage of the roll, an adhesive film, present for example on a label face paper, is applied to the coated paper and the composite is then compressed. In the inline method the silicone composition is applied to the paper and crosslinked, the silicone coating is coated with the adhesive, the label face paper is then applied to the adhesive, and the composite, finally, is compressed.

In the case of the offline method the winding speed is governed by the time needed to render the silicone coating tack-free. In the case of the inline method the process speed is governed by the time needed to render the silicone coating migration-free. With the compositions of the invention the offline method and the inline method can be operated at speeds from 300 to 1500 m/min, preferably from 400 to 1000 m/min.

PREPARATION OF THE ALKENYL-FUNCTIONAL SILOXANE COPOLYMERS

Example 1

A total of 162 g of 1,2,4-trivinylcyclohexane, in which a 1% strength by weight (based on elemental platinum) solution of a platinum-1,3-divinyl-1,1,3,3-tetramethyldisiloxane complex in an α,ω-divinyl-dimethylpolysiloxane having a viscosity of 1000 mPa.s at 25° C., a catalyst solution known as the Karstedt catalyst (whose preparation is described in U.S. Pat. No. 3,775,452) has been dissolved, so that the solution contains 40 ppm platinum, are slowly metered into 503 g of 1,1,3,3-tetramethyldisiloxane which has been heated to 50° C. After the end of metering, reaction is allowed to continue at 80° C. and a C=C conversion ($^1$H-NMR) of more than 99% is achieved. Excess disiloxane is removed by distillation, giving a hydrosiloxane polymer having a viscosity of 60 mm$^2$/s (25° C.) and an Si-bonded hydrogen content (active hydrogen content) of 0.43% by weight.

At 25° C., 50 g of this intermediate are mixed homogeneously into 3120 g of an α,ω-divinyldimethylpolysiloxane having a chain length of 100 Si atoms ($Si_{100}$) and this mixture is activated with 3.2 g of the above-described Karstedt catalyst solution with a platinum content of 1% by weight. The vigorously stirred mixture becomes considerably more viscous and after 80 minutes reaches a viscosity of 6700 mm$^2$/s (25° C.). In accordance with the reactants, a highly branched siloxane polymer is obtained containing vinyl-Si end groups and having an Si-bonded vinyl group content (vinyl content) of 0.20 meq/g. The polymer is colorless and clear and can be mixed in any proportion with an α,ω-divinyldimethylpolysiloxane having a viscosity of 500 mPa.s (25° C.).

Example 2

A mixture of 90.2 g of 1,2,4-trivinylcyclohexane and 1869 g of an α,ω-dihydrodimethylpolysiloxane having an active hydrogen content of 0.214% by weight is activated at 25° C. by adding 0.34 g of a Karstedt catalyst solution with a platinum content of 1% by weight (as described in Example 1). A temperature rise to 70° C. within a few minutes indicates onset of hydrosilylation, which achieves more than 99% conversion after 15 minutes. The branched siloxane polymer with SiH end groups has an active hydrogen content of 1.19 meq/g and a viscosity of 27 mm$^2$/s (25° C.).

In order to prepare a branched vinyl polymer, 126 g of the above-obtained SiH-functional polymer are mixed with 392 g of an α,ω-divinyldimethylpolysiloxane having a vinyl content of 0.67 meq/g and the mixture is heated to 47° C. The addition of 10 ppm platinum in the form of the Karstedt catalyst solution (as described in Example 1) leads to an immediate temperature increase to 68° C., and after 30 minutes to a colorless, clear vinyl-functional polymer having a viscosity of 4840 mm²/s (25° C.) and a vinyl content of 0.22 meq/g.

Example 3

The procedure of Example 2 is repeated with the modification that instead of the 392 g of an α,ω-divinyldimethylpolysiloxane having a vinyl content of 0.67 meq/g, 1089 g of the α,ω-divinyldimethylpolysiloxane having a chain length of 100 Si atoms ($Si_{100}$) are used. This gives a branched vinyl polymer having a viscosity of 7510 mm²/s (25° C.) and a vinyl content of only 0.12 meq/g as a clear, colorless oil.

Example 4

The procedure of Example 2 is repeated with the modification that instead of the 392 g of an α,ω-divinyldimethylpolysiloxane having a vinyl content of 0.67 meq/g, 2040 g of an α,ω-divinyldimethylpolysiloxane having a chain length of 163 Si atoms ($Si_{163}$) are used. As a result of the increase in the chain length of the α,ω-divinyldimethylpolysiloxane used, the arm length of the branched vinyl polymer is increased further. The result is a clear, colorless oil having a viscosity of 11,100 mm²/s (25° C.) and a vinyl content of only 0.087 meq/g.

Example 5

A mixture of 75.2 g of 1,2,4-trivinylcyclohexane and 1242 g of an α,ω-dihydrodimethylpolysiloxane having an active hydrogen content of 0.185% by weight is activated at 25° C. by adding 0.26 g of a Karstedt catalyst solution with a Pt content of 1% by weight (as described in Example 1). The immediate exothermic reaction beats the mixture to 82° C., with a conversion of the C=C groups of more than 99% being achieved (¹H-NMR). The resultant branched hydrogen-functional siloxane polymer has a viscosity of 159 mm²/s (25° C.) and an active hydrogen content of 0.70 meq/g.

A branched vinyl polymer is prepared from this precursor by homogeneously mixing 68 g of this product with 647 g of α,ω-divinyldimethylpolysiloxane having a chain length of 100 Si atoms ($Si_{100}$) and activating the mixture with 10 ppm platinum in the form of a solution of the Karstedt catalyst (as described in Example 1). With slight heating, the mixture becomes considerably more viscous and finally reaches 3570 mm²/s (25° C.). The vinyldimethylsiloxy group content is 0.182 meq/g. The polymer can be combined in any proportion with linear α,ω-divinyldimethylpolysiloxane having a viscosity of 500 mPa.s (25° C.) to give a clear mixture.

Example 6

In order to prepare branched vinyl polymers with even higher viscosity, it is advantageous to use solvents.

Accordingly, 40 g of the hydrogen-functional siloxane polymer precursor from Example 5 are mixed thoroughly with 454 g of α,ω-divinyldimethylpolysiloxane having a viscosity of 490 mm²/s (25° C.) and 494 g of toluene, and the polyaddition is initiated by adding 0.49 g of a Karstedt catalyst solution with a platinum content of 1% by weight (as described in Example 1). Over a period of about 2 hours the temperature rises only a little. Then 170 g of α,ω-divinyldimethylpolysiloxane having a chain length of 100 Si atoms ($Si_{100}$) are metered in and all of the toluene is removed in vacuo at 100° C. This gives a very viscous solution of a branched vinyl polymer in linear vinyl polymer at 10,400 mm²/s (25° C.). The vinyl content is 0.14 meq/g.

Example 7

Example 5 is repeated with a reduced amount of 1,2,4-trivinylcyclohexane. Instead of 75.2 g of 1,2,4-trivinylcyclohexane only 70.7 g are used, in order to give a more highly branched hydrogen-functional siloxane polymer. Following complete conversion of the C=C groups, a pale yellowish oil is obtained which has a viscosity of 416 mm²/s (25° C.) and an active hydrogen content of 0.061% by weight.

This precursor can be used to prepare very highly branched siloxanes containing terminal vinyl groups, by mixing 99 g of this precursor with 762 g of α,ω-divinyldimethylpolysiloxane having a chain length of 100 Si atoms ($Si_{100}$) and adding 415 g of toluene. Following the addition of 0.7 g of a Karstedt catalyst solution with a Pt content of 1% by weight (as described in Example 1), the viscosity of the solution slowly rises to reach a final viscosity of 1640 mm²/s (25° C.). 1000 g of additional α,ω-divinyldimethylpolysiloxane are then added and the toluene is removed under reduced pressure at 100° C. The result is a clear, colorless solution of a highly branched siloxane copolymer in the linear siloxane polymer, which has a viscosity of 5450 mm²/s (25° C.) and a vinyldimethyl group concentration of 0.23 meq/g.

Example 8

Example 5 is repeated using in stage 2 the same amount of the branched, hydrogen-functional siloxane polymer but only 540 g instead of 647 g of the linear α,ω-divinyldimethylpolysiloxane having a chain length of 100 Si atoms ($Si_{100}$). For better viscosity control, 406 g of toluene are added prior to activation and the mixture is stirred until homogeneous. A viscosity of 610 mm²/s (25° C.) is achieved.

In order to prepare a solvent-free branched siloxane copolymer, 227 g of the same linear α,ω-divinyldimethylpolysiloxane of chain length $Si^{100}$ are then admixed and the toluene is removed under reduced pressure at 100° C. This gives a clear, colorless oil having a viscosity of 5400 mm²/s (25° C.) and a vinyldimethylsiloxy unit content of 0.195 meq/g.

USE OF THE ALKENYL-FUNCTIONAL SILOXANE COPOLYMERS AS ANTIMISTING ADDITIVES

Example 9

At a high application weight and with certain coating formulations, aerosol may be formed even at machine speeds well below 500 m/min. The branched siloxane copolymers of the invention were used as additives for reducing the formation of aerosol, in crosslinkable silicone coating systems for use in such coating processes.

The standard formulation used was a mixture of 100 parts by weight of a branched polysiloxane containing vinyldimethylsiloxy end groups, having a viscosity of 420 mPa.s (25° C.) and an iodine number of 8.0, prepared in accordance with Example 3 of U.S. Pat. No. 6,034,225, 3.6 parts by weight of a linear polysiloxane comprising hydromethylsiloxane and trimethylsiloxane units in a molar ratio of 24:1, 1.04 parts by weight of a 1% strength by weight (based on elemental platinum) solution of a platinum-1,3-divinyl-1,1, 3,3-tetramethyldisiloxane complex in an α,ω-divinyldimethylpolysiloxane having a viscosity of 1000 mPa.s at 25° C., and 0.3 part by weight of 1-ethynylcyclohexanol.

The additives of the invention from the preparation examples indicated in table 1 were added to the standard formulation in the amounts specified in table 1. As a control, a standard formulation without an inventive additive was used. These mixtures were used for coating paper.

The substrate used was paper from Ahlstrom bearing the designation Glassine Larice Tipo 325, 62 g/m². Coating was carried out on a pilot coating unit from Dixon with the model number 1060, having a 5-roll applicator unit, at 150 m/min. The application roller was run at 95% of the paper speed. The coating was cured in a drying oven with a length of 3 m at 140° C.

The formation of aerosol was determined using the Dusttrak Aerosol Monitor Model 8520. Samples were taken between the silicone application roll and the roll nip at a distance of 12 cm from the silicone application roll. Additionally, the formation of aerosol was assessed visually and evaluated with the codes 1–3:

1 no visible aerosol formation
2 slightly visible aerosol formation
3 severe aerosol formation.

During the coating experiments, the maximum indicated aerosol levels were recorded. The coating weight was determined by means of X-ray fluorescence analysis in reference to an appropriate standard, and was 2.5 g/m². The results are summarized in table 1.

TABLE 1

| Additive | Amount of additive in % | Misting, mg/m³ (Dusttrak) | Misting (visual) |
|---|---|---|---|
| Example 5 | 4 | 1.5 | 1.5 |
| Example 6 | 4 | 1.0 | 1 |
| Example 7 | 8 | 1.1 | 1 |
| Example 8 | 4 | 1.5 | 1 |
| — | — | 20 | 3 |

The comparative experiments show that the addition of the branched vinyl-functional siloxane copolymers of the invention as antimisting additives markedly reduces the formation of aerosol by crosslinkable silicone coating systems in rapid coating processes.

Example 10

The alkenyl-functional siloxane copolymers of the invention are used as additives for reducing the formation of aerosol in crosslinkable silicone coating systems for use in rapid coating processes.

The standard formulation used was a mixture of 100 parts by weight of a linear α,ω-divinyldimethylpolysiloxane, having a viscosity of 300 mPa.s (25° C.), 3.1 parts by weight of a linear polysiloxane comprising hydromethylsiloxane and dimethylsiloxane units in a molar ratio of 2:1 having trimethylsiloxane end units and a viscosity of 34 mPa.s (25° C.), 1.25 parts by weight of a 1% strength by weight (based on elemental platinum) solution of a platinum-1,3-divinyl-1,1,3,3-tetramethyldisiloxane complex in an α,ω-divinyldimethylpolysiloxane having a viscosity of 1000 mPa.s at 25° C., and 0.3 part by weight of 1-ethynylcyclohexanol.

The additives of the invention from the preparation examples indicated in table 2 were added to the standard formulation in the amounts specified in table 2. As a control, a standard formulation without inventive additive was used. These mixtures were used for coating paper.

The substrate used was paper from Ahlstrom bearing the designation Glassine Larice Tipo 325, 62 g/m². Coating was carried out on the "BMB Pilotplant" coating unit from Bachofen & Meier AG, having a 5-roll applicator unit, at 550 m/min. The application roller was run at 95% of the paper speed. The coating was cured in a drying oven with a length of 18 m at 160° C. This corresponds to a crosslinking time of 1.96 seconds.

The formation of aerosol was determined using the Dusttrak Aerosol Monitor Model 8520. Samples were taken between the silicone application roll and the roll nip at a distance of 12 cm from the silicone application roll. The blank aerosol value prior to the coating tests was between 0.028–0.031 mg/m³. During the coating tests, the minimum and maximum indicated aerosol levels were recorded and the average was calculated. The average aerosol levels measured during the coating tests were corrected by the blank value of 0.03 mg/m³ in order to determine the effect due purely to the antimisting additives of the invention.

The coating weight was determined by means of x-ray fluorescence analysis in reference to an appropriate standard. Since the extent of aerosol formation is dependent among other things on the coating weight, the average calculated aerosol levels were standardized to a coating weight of 1 g/m² for the purpose of better comparability.

The effect of the antimisting additives of the invention on the curing of the coating system was determined immediately by means of a migration test and in parallel by means of extraction of uncrosslinked fractions in MIBK (methyl isobutyl ketone). The effect of the antimisting additives of the invention on the adhesion of the coating system to the substrate was determined by means of a ruboff test. The test methods are described in the brochure DEHESIVE® Silicones Test Methods from Wacker-Chemie GmbH. The results are summarized in table 2.

TABLE 2

| Additive | Amount [%] | Misting [mg/m³] | | | Average misting [mg/m³] standardized to 1.0 g/m² | Migration | Abrasion | Extract [%] in MIBK |
|---|---|---|---|---|---|---|---|---|
| | | min. | max. | av. | | | | |
| Ex. 5 | 4 | 0.200 | 0.233 | 0.215 | 0.11 | no | no | 4.3 |
| Ex. 5 | 2 | 0.387 | 0.488 | 0.426 | 0.21 | no | no | 4.5 |
| Ex. 6 | 4 | 0.177 | 0.209 | 0.189 | 0.09 | no | no | 5.4 |
| — | — | 19.47 | 30.17 | 24.27 | 16.51 | no | no | 5.0 |

The examples in comparison with the control test without additive show that the addition of the antimisting additives of the invention significantly reduces the formation of aerosol by crosslinkable silicone coating systems in rapid coating processes. Deleterious effects on migration and substrate adhesion (abrasion) are not observed; within the bounds of measurement accuracy, the proportion of the extractable fractions is not increased.

Example 11 and Comparative Test as per EP-B 716 115

An important criterion for the simple usefulness of antimisting additives in curable compositions is their miscibility with these compositions. In order to obtain reproducible results when curing on the coating machine, it is advantageous if the additive can be dispersed homogeneously in the desired amount in the curable composition without unduly great effort, and forms a clear formulation. Accordingly, 104.4 g of the standard formulation from Example 10 are mixed with 10 g of each of the additives from preparation examples 1 to 8 by moderate stirring using a glass rod, so that a ready-to-use formulation is formed within a few minutes. All formulations are homogeneous, clear, and free from streaks.

For comparison, in accordance with the state of the art, an antimisting additive as per EP-B 716 115 is prepared:

A mixture of 34 g of 2-methyl-3-buten-2-ol and 190 g of an allyl polyether of the formula $CH_2=CH-CH_2O(C_2H_4O)_{9.4}H$ is mixed with 200 g of a siloxane having trimethylsiloxy end groups and comprising hydromethylsiloxane and dimethylsiloxane units (0.30% by weight active hydrogen, viscosity 37 mm$^2$/s at 25° C.), and the mixture is heated to 50° C. and activated with 20 ppm platinum in the form of the platinum catalyst described in Example 10 (Karstedt catalyst). After 2 hours, the exothermic reaction gives a clear product with an active hydrogen content of less than 0.002% by weight and a slight brown coloration. Stirring 10 g of this product into 104.4 g of the standard formulation from Example 10 gives a milky mixture which shows severe phase separation after 4 hours of storage. Even when only 5 g of this additive is mixed in under strong shearing with a Turrax® device, a clear formulation is not obtained.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a process for reducing aerosol in applying a crosslinkable silicone coating composition onto a substrate wherein an antimisting additive is added to the coating composition, the improvement comprising adding to said crosslinkable silicone coating composition from 0.5 to 10.0 weight percent of an antimisting additive comprising at least one alkenyl-functional siloxane copolymer prepared by
reacting, in a first step a compound (1) containing at least three aliphatic double bonds, of the formula $$R^2(CR^3=CH_2)_x \quad (I)$$

where $R^2$ is a trivalent or tetravalent hydrocarbon radical optionally containing one or more non-adjacent oxygen, silicon, or titanium heteroatoms,
$R^3$ is a hydrogen atom or alkyl radical, and
x is 3 or 4
with an organosiloxane (2) having terminal Si-bonded hydrogen atoms, in the presence of at least one hydrosilylation catalyst (3),
the ratio of Si-bonded hydrogen in the organosiloxane (2) to aliphatic double bond in organic compound (1) being from 1.3 to 10, and
reacting, in a second step, SiH-containing hydrocarbon-siloxane copolymer(s) obtained in the first step with at least one α,ω-dialkenylsiloxane polymer (4), in the presence of a hydrosilylation catalyst (3),
the ratio of aliphatic double bond in the α,ω-dialkenylsiloxane polymer (4) to SiH groups in the hydrocarbon-siloxane copolymer(s) being from 1.2 to 10,
and optionally, in a third step,
equilibrating alkenyl-functional siloxane copolymer(s) obtained from the second step with one or more organopolysiloxane(s) (5) selected from the group consisting of linear organopolysiloxanes containing terminal triorganosiloxy groups, linear organopolysiloxanes containing terminal hydroxyl groups, branched organopolysiloxanes optionally containing hydroxyl groups, cyclic organopolysiloxanes, and copolymers comprising diorganosiloxane and monoorganosiloxane units,
and crosslinking said composition on said substrate,
wherein said weight percents are based on the total weight of the crosslinkable coating composition and the antimisting additive.

2. The process of claim 1 wherein $R^2$ is a $C_{1-25}$ alkyl radical and $R^3$ is a $C_{1-6}$ alkyl radical.

3. The process of claim 1, wherein said organosiloxane (2) has the formula $$HR_2SiO(SiR_2O)_nSiR_2H \quad (II)$$

where each R independently is an optionally halogenated hydrocarbon radical having from 1 to 6 carbon atoms per radical and
n is 0 or an integer greater than 0.

4. The process of claim 1, wherein $R^2$ is a trivalent hydrocarbon radical having from 1 to 25 carbon atoms per radical and x is 3.

5. The process of claim 2, wherein $R^2$ is a trivalent hydrocarbon radical having from 1 to 25 carbon atoms per radical and x is 3.

6. The process of claim 3, wherein $R^2$ is a trivalent hydrocarbon radical having from 1 to 25 carbon atoms per radical and x is 3.

7. The process of claim 1, organic compound (1) comprises 1,2,4-trivinylcyclohexane.

8. The process of claim 1, wherein said α,ω-dialkenylsiloxane polymer (4) has the formula $$R^4{}_aR_{3-a}SiO(R_2Si-R^1-SiR_2O)_m(R_2SiO)_kSiR^4{}_aR_{3-a} \quad (III)$$

where each R independently is an optionally halogenated hydrocarbon radical having from 1 to 6 carbon atoms per radical and
n is 0 or an integer greater than 0.
$R^1$ is a $C_{2-10}$ alkylene radical, a divalent silane, or divalent siloxane radical,
$R^4$ is a terminally olefinically unsaturated $C_{2-10}$ hydrogen radical,
a is identical or different and is 0 or 1, and on average from 0.7 to 1.0,
m is 0 or an integer from 1 to 10, and
k is 0 or an integer from 1 to 1000.

9. The process of claim 1, wherein said α,ω-dialkenylsiloxane polymer (4) comprises α,ω-divinylpolydimethylsiloxane(s).

10. The process of claim 1, wherein said crosslinkable silicone coating composition comprises
  (A) organosilicon compounds having radicals containing aliphatic carbon-carbon multiple bonds other than said antimisting additive,
  (B) organosilicon compounds containing Si-bonded hydrogen atoms,
  (C) catalysts which promote the addition of Si-bonded hydrogen onto an aliphatic multiple bond, and optionally,
  (D) inhibitors.

11. A process for reducing aerosol in applying a crosslinkable silicone coating composition onto a substrate comprising coating said substrate with a coating composition comprising from 0.5 to 10.0 weight percent of
  (A) organosilicon compounds having radicals containing aliphatic carbon-carbon multiple bonds comprising a linear organopolysiloxane of the formula (V),

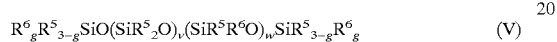

$$R^6_g R^5_{3-g} SiO(SiR^5_2 O)_v (SiR^5 R^6 O)_w SiR^5_{3-g} R^6_g \quad (V)$$

where $R^5$ is a monovalent, optionally substituted hydrocarbon radical having from 1 to 18 carbon atoms per radical and free from aliphatic carbon-carbon multiple bonds,
  $R^6$ is a monovalent hydrocarbon radical having from 2 to 8 carbon atoms per radical and containing a terminal aliphatic carbon-carbon multiple bond,
  g is 0, 1 or 2,
  v is 0 or an integer from 1 to 1500, and
  w is 0 or an integer from 1 to 200,
  with the proviso that on average at least 1.5 radicals $R^6$ are present,
  wherein the units —(SiR$^5_2$O)— and —(SiR$^5$R$^6$O)— may be distributed in any manner within said linear organopolysiloxane,
  (B) organosilicon compounds containing Si-bonded hydrogen atoms,
  (C) catalysts which promote the addition of Si-bonded hydrogen onto aliphatic multiple bond,
  (D) optionally, inhibitors, and
  at least one antimisting additive comprising an alkenyl-functional siloxane copolymer prepared by
  reacting, in a first step a compound (1) containing at least three aliphatic double bonds, of the formula

$$R^2(CR^3=CH_2)_x \quad (I)$$

where $R^2$ is a trivalent or tetravalent hydrocarbon radical optionally containing one or more non-adjacent oxygen, silicon, or titanium heteroatoms,
  $R^3$ is a hydrogen atom or alkyl radical, and
  x is 3 or 4
  with an organosiloxane (2) having terminal Si-bonded hydrogen atoms,
  in the presence of at least one hydrosilylation catalyst (3),
  the ratio of Si-bonded hydrogen in the organosiloxane (2) to aliphatic double bond in organic compound (1) being from 1.3 to 10, and
  reacting, in a second step, SiH-containing hydrocarbon-siloxane copolymer(s) obtained in the first step with at least one α,ω-dialkenylsiloxane polymer (4),
  in the presence of a hydrosilylation catalyst (3),
  the ratio of aliphatic double bond in the α,ω-dialkenylsiloxane polymer (4) to SiH groups in the hydrocarbon-siloxane copolymer(s) being from 1.2 to 10,
  and optionally, in a third step,
  equilibrating alkenyl-functional siloxane copolymer(s) obtained from the second step with one or more organopolysiloxane(s) (5) selected from the group consisting of linear organopolysiloxanes containing terminal triorganosiloxy groups, linear organopolysiloxanes containing terminal hydroxyl groups, branched organopolysiloxanes optionally containing hydroxyl groups, cyclic organopolysiloxanes, and copolymers comprising diorganosiloxane and monoorganosiloxane units,
  and crosslinking said composition on said substrate,
  wherein said weight percents are based on the total weight of the crosslinkable coating composition and the antimisting additive.

12. The process of claim 11, wherein said coating composition further comprises a linear or branched organopolysiloxane comprising units of the formula (IV)

$$R^5_z R^6_y SiO_{\frac{4-z-y}{2}} \quad (IV)$$

where z is 0, 1, 2 or 3,
  y is 0, 1 or 2,
  and the sum z+y is 0, 1, 2 or 3,
  with the proviso that there are on average at least 1.5 radicals $R^6$.

* * * * *